April 3, 1928.  1,664,417
F. L. HUNT ET AL
COMBINED STATOSCOPE AND RATE-OF-CLIMB INDICATOR
Filed Nov. 11, 1922   2 Sheets-Sheet 1
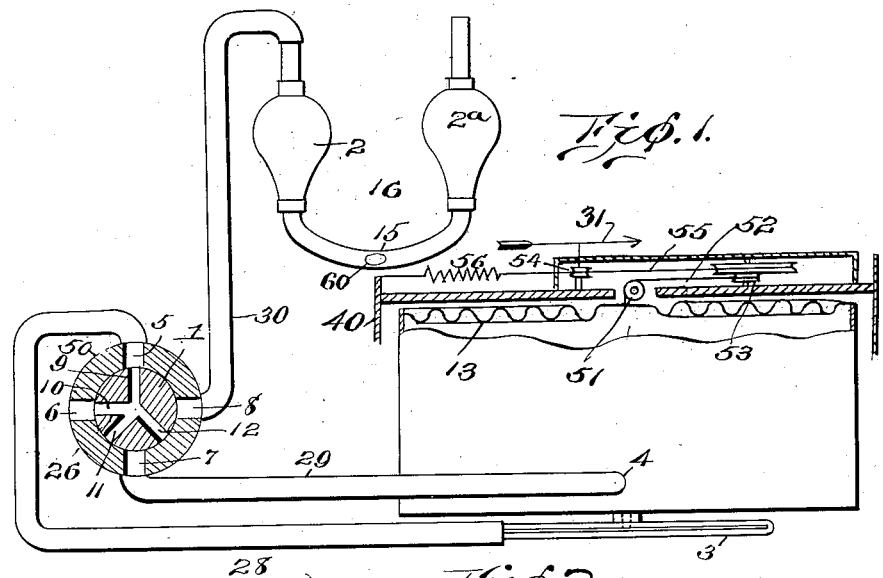
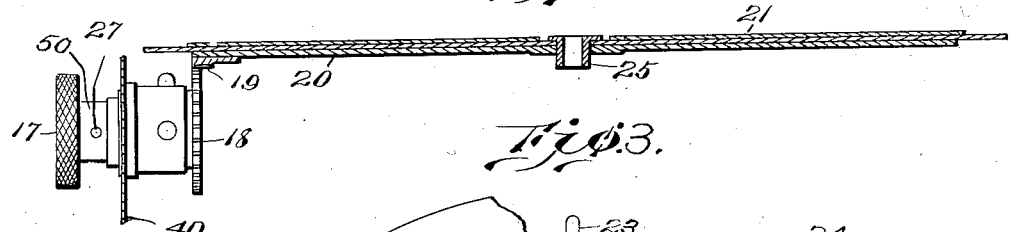
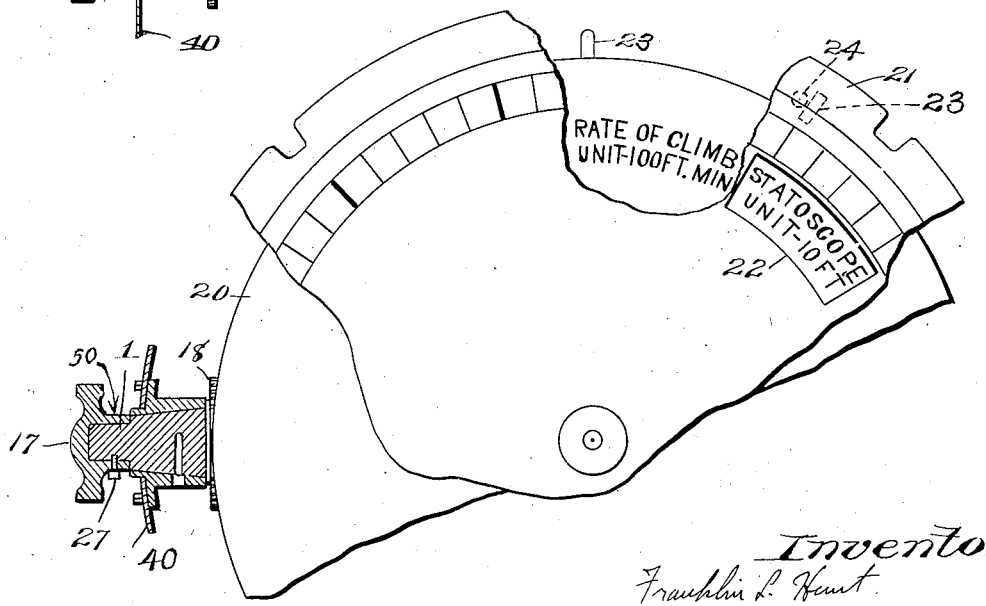

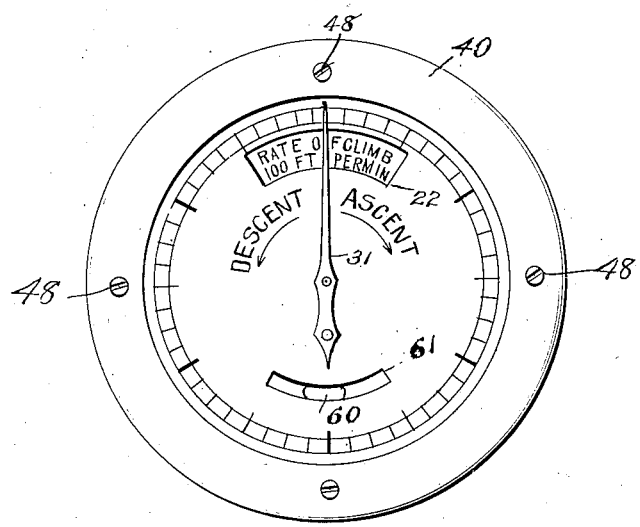

Patented Apr. 3, 1928.

1,664,417

UNITED STATES PATENT OFFICE.

FRANKLIN L. HUNT AND ATHERTON H. MEARS, OF WASHINGTON, DISTRICT OF COLUMBIA.

COMBINED STATOSCOPE AND RATE-OF-CLIMB INDICATOR.

Application filed November 11, 1922. Serial No. 600,467.

This invention relates in general to altitude instruments and more particularly to an instrument for indicating change of altitude and rate of change of altitude.

Our instrument is one in which there is provided means for ready indication of ascent or descent and is so designed that by the movement of a single manually operated valve it may be converted into a climeter or rate-of-climb indicator.

Our device is capable of use in many arts though it was primarily constructed for use in connection with aeronautics. It is, however, our object to provide a statoscope of a novel and most efficient type, a new and efficient type of climeter, and further, a combination of the functioning elements of the statoscope and climeter in one instrument capable of being readily adjusted to function as either statoscope or climeter. The advantages incident to such an arrangement are obvious. A statoscope is used when it is desired to fly at a certain constant level and it is useless and an additional weight and complication when not in use. A rate of climb indicator is to be used when it is desired to study rates of climb or to maintain a certain rate of climb. When flying level such an instrument is useless and a source of dead weight to the plane and confusion to the pilot. By uniting these two instruments into one, weight is saved and the number of controlled mechanisms to be handled by the pilot is lessened.

A further object is to provide an instrument whose parts are compactly arranged and easily taken apart and put together.

Other objects will be obvious from the following description in which reference is had to the annexed drawings, in which—

Figure 1 is a diagram of the connections of the air chamber, capillary tube or leak device, and trap or valve;

Fig. 2 is a sectional view of the dial showing in elevation the outlet changing device;

Fig. 3 is a plan view of the dial, partly in sections and with parts broken away;

Figure 4 is a plan view of our device partly disassembled.

Figure 5 is a plan view of our device completely assembled.

Referring with greater particularity to the drawings, our device will be seen to comprise an air chamber 14 having rigid side and bottom members and top member 13, consisting of an elastic diaphragm secured to the side walls of the container 14 in an airtight manner. This diaphragm is made of a sheet of corrugated metal, such as phosphor bronze or some other metal of like properties. It is essential that the metal employed be one sufficiently elastic and one which has the least possible elastic lag.

The chamber 14 is opened to the atmosphere through a leak device 3, which is merely a curved capillary tube, a tube connection 28 and an outlet changing device 50, later referred to.

The diaphragm 13 operates the indicator hand 31 through a multiplying device which will now be described. A cord 52 is secured to the diaphragm 13, passes over the idler pulley 51 and is secured to small pulley 53. The cord 55 is secured to the multiplying pulley 50 and passes around the pointer pulley 54 and is secured by a spring connection 56 to the outer casing 40. It will be readily seen by such an arrangement that a small deflection of the diaphragm 13 will cause the pointer 31 to move a comparatively large arc. The spring connection 56 keeps the cords 52 and 55 always taut.

The outlet changing device consists of a valve arrangement comprising a body 26 with four outlets 5, 6, 7 and 8. Within this body there is rotatably mounted a tapered shaft 1 in which there are drilled four holes 9, 10, 11 and 12 at suitable positions for the purposes which will be hereinafter described.

The rotation of the valve shaft is effected by turning the knurled thumb screw or knob 17. This member 17 is secured to the shaft 1 by a set screw 27. At the end of shaft 1, opposite to that of the knurled screw, is a pinion 18 which is adapted to mesh with a circumferential rack 19 mounted on plate 20. This plate 20 is free to rotate about its bearing 25 which is attached to the dial 21. The motion of the plate 20 is limited by stops 23 which engage pin 24 for the purpose of limiting the movement of the plate within the limits of the dimensions of the arcuate rack 19 which extends around the circumference of the plate only to a sufficient degree to insure the movement of the two scales on the rate of climb, and statoscope into position to be seen through the slot 22 and the dial 21, hereinafter to be described.

There is a slot 22 in the dial 21 through which markings on plate 20 may be seen.

When the outlet changing device 50 is in the position as shown in Figure 1, the instrument will operate as a rate of climb indicator.

The air container 14 of the instrument is in communication with the outside air through the leak device 3, connecting tube 28, outlet 5 of outlet changing device, holes 9 and 10, and the outlet to the air 6. On ascending or descending changes in the atmospheric pressure will cause the diaphragm to deflect. This deflection is transmitted to the indicator hand 31 through the multiplying mechanism.

When the shaft 1 is rotated through such an angle that the port 12 in the shaft 1 is brought into communication with the outlet number 8 and the port 11 in registration with the outlet port 7 the instrument will operate as a statoscope. As the air chamber 14 of the instrument is in connection with the trap or valve 16, through the opening 4, the tube connection 29, the port 7 in the body 26 of the outlet changing device 50, ports 11 and 12 in the shaft 50, outlet port 8 and tube connection 30 to the trap or valve 16.

The tube 15 of the form of trap or valve 16 shown in Figure 1 is partly filled with a nonfreezing liquid 60, such as kerosene, thus forming a seal between the air in both ends of the trap. If the outlet changing device 50 is set as described above, so that the instrument is to function as a statoscope, the action of the trap or valve 16 is as follows:

If the pressure of the external air on the instrument decreases slightly the liquid seal in the trap or valve prevents the air pressure from equalizing with that in the air chamber 14 and its connections to the trap. This differential pressure thereby causes the diaphragm 13 to deflect and the indication of the slight decrease of pressure is shown on the dial 21 of the instrument by the medium of the multiplying mechanism and an indicator or needle. Simultaneously the liquid in the tube 15 is pushed by the expanding air towards the bell 2ª of the trap or valve 16 that is in communication with the external air. This motion is proportional to the pressure difference. When this pressure difference becomes a certain amount the liquid is pushed up into the bell and forms a bubble. If the pressure decreases still more and the pressure difference becomes greater the bubble moves into the enlarged section of the bell and breaks, thus allowing the quick rush of air out of the system and allowing the pressure to equalize. The liquid then flows to the middle of the tube 15 and again forms a seal. If the external air pressure still is decreasing the above cycle of operation is repeated. For increasing external air pressure the cycle of operation takes place towards and in the bell 2.

The setting of the outlet changing device 50 to the exact position for the operation of the instrument as a rate-of-climb indicator or statoscope is facilitated in the present form of the design of the instrument by the stops 23 and the pin 24 on the plate 20. The pinion 18 rigidly attached to the outlet changing device 50 engages the circular rack 19 attached to the rotating plate 20, thereby causing a movement in the plate 20 for any rotation of the outlet changing device 50. Hence for each position of the outlet changing device 50 there corresponds a position of the plate 20. When the pin 24 is against one of the stops 23 the outlet changing device 50 makes the proper connections for the instrument to operate as a rate-of-climb indicator; when against the other stop the outlet changing device 50 makes the proper connections for the instrument to operate as a statoscope.

In the present form of the instrument the dial 21 has a slot 22 cut in it thereby exposing the plate 20 which rotates underneath the dial 21 on bearing 25. When the pin 24 is against one of the stops 23 and the instrument is functioning as a statoscope the exposed portion of the plate 20 shows some suitable marking such as "statoscope."

If now the thumb screw or knob 17 is rotated and the pin 24 rests against the other stop 23 the instrument will operate as a rate-of-climb indicator and the marking shown on the plate is "rate-of-climb."

The dial 21 is also provided with a slot 61 through which the movement of the liquid in tube 15 can be observed. By this arrangement, the observer has two indications when the device operates as a statoscope.

Another feature of the above described outlet changing device 50 is the location of the ports 9, 10, 11 and 12. The port 10 is drilled at an angle of 90° from port 9 and both are perpendicular to the axis of the shaft. The port 11 is drilled at an angle of 45° from 10 and the port 12 at an angle of 135° from the hole 10.

The diameter of the shaft 1 and the size of these ports 9, 10, 11 and 12 are of such dimensions that, when taken in conjunction with the size of the ports 5, 6, 7 and 8, in every possible angle to which the shaft 1 may be rotated at least a portion of one of the ports 5, 6, 7 and 8 will be in connection with such of the ports 9, 10, 11 and 12 as to provide, at all times, either directly or through the trap 16 a communication between the interior of the body 14 and the outside air.

By this arrangement it is impossible to subject the diaphragm 13 to excessive pressures, since for any position of the outlet changing device 50 the air chamber 14 is always in communication either with the trap or valve 16 or the outlet to the air 6 or both the outlet 6 and trap or valve 16.

Referring more particularly to Figures 4 and 5, it will be noted that we have adapted our device to be inclosed in a suitable container 40. A series of studs 41 near the top surface of the side walls of the container 14 are arranged for the reception of the frame 42. This frame has suitable fastening means 44 and 45 for fixedly supporting the trap 16. Suitable set screws 48 are provided to hold the frame and cover in position on the casing.

It will be noted by this structure we have provided an apparatus which is extremely simple in construction and is easily disassembled. The unique dial card and provision for reading the same is also a feature of our invention.

What we claim is—

1. In a combined statoscope and rate-of-climb meter, the combination of a pressure responsive device comprising a container and a diaphragm, an indicating means operatively connected to said diaphragm, a leakage device comprising a capillary tube connecting said container to the atmosphere, a flexible sealing means connected to said container adapted to seal the container against differential pressure up to a certain degree, and a two-way valve interposed between the container and said leakage and flexible sealing devices in such manner that the container is operatively connected to only one of said devices at a time.

2. In a combined statoscope and rate-of-climb meter, the combination of a pressure responsive device comprising a container and a diaphragm, a leakage device connected to said container, a flexible sealing device connected to said container, a two-way valve interposed between the container and said leakage and sealing devices in such manner as to operatively connect either of said devices to said container, and an indicating means comprising a pointer operatively connected to said diaphragm and a dial, said dial having two portions, one of said portions being geared to said two-way valve in such a manner that movements of the valve to connect either device to the container will also position the two portions of the dial to indicate the proper unit of measure for each device.

3. In a combined statoscope and rate-of-climb meter, the combination of a pressure responsive device comprising a container and a diaphragm, an indicating means operatively connected to said diaphragm, a leakage device comprising a capillary tube connecting said container to the atmosphere, a flexible sealing means connected to said container adapted to seal the container against differential pressure up to a certain degree, and a two-way valve to be interposed between the container and said leakage and flexible sealing device in such manner that the container is operatively connected to only one of said devices at a time, said two-way valve having parts arranged in such manner as to prevent excessive pressures occurring within the pressure-responsive device on cutting in and out said leakage and sealing devices.

In testimony whereof we affix our signatures.

FRANKLIN L. HUNT.
ATHERTON H. MEARS.